United States Patent [19]
Tresselt

[11] 3,750,172
[45] July 31, 1973

[54] MULTIFREQUENCY CW RADAR WITH RANGE CUTOFF

[75] Inventor: Carl P. Tresselt, Detroit, Mich.

[73] Assignee: The Bendix Corporation, Southfield, Mich.

[22] Filed: June 2, 1971

[21] Appl. No.: 149,265

[52] U.S. Cl. .................................. 343/12 R, 343/9
[51] Int. Cl. .......................... G01s 9/38, G01s 9/44
[58] Field of Search .............................. 343/9, 12 R

[56] References Cited
UNITED STATES PATENTS

| | | | |
|---|---|---|---|
| 2,524,050 | 10/1950 | Ginzton ................................. | 343/9 |
| 3,383,686 | 5/1968 | Davis et al. ................. | 343/17.2 R X |
| 3,611,370 | 10/1971 | Frasure et al. ..................... | 343/9 X |
| 2,435,615 | 2/1948 | Varian et al. ........................... | 343/9 |
| 1,785,307 | 12/1930 | Hammond, Jr. .................... | 343/9 X |
| 3,623,096 | 11/1971 | Morris ................................. | 343/7.7 |

*Primary Examiner*—Malcolm F. Hubler
*Attorney*—Lester L. Hallacher and Plante, Hartz, Smith and Thompson

[57] ABSTRACT

This invention is directed to a CW radar system having range cutoff capability to render it insensitive to targets beyond a preselected range. Three frequencies are sequentially transmitted and reflections from a relatively moving target received to produce three doppler frequencies. The doppler shifts on the highest and lowest transmitted frequencies are phase compared to indicate range between the target and the antenna, which is unambiguous out to a preselected range. By noting the leading-lagging relationship of these two doppler frequencies, phase can be used below the ambiguous range to indicate whether the target is approaching or receding from the antenna. The third transmitted frequency lies between the other two, and produces an additional doppler frequency which can be phase compared with either of the other two doppler signals. Since the carrier frequency difference is lower in this latter comparison, the ambiguity in indicated range will occur at a greater distance. The lower difference frequency can accordingly be used to generate an inhibit signal for targets which fall near or beyond the ambiguity point of the first, higher deviation range measurement channel. Alternately, the third doppler can be phase compared with both of the other two and the results averaged for signal-to-noise ratio improvement. The average long range thus obtained is then used to generate the long-range inhibit signal when the average long-range value is beyond the preselected range.

30 Claims, 4 Drawing Figures

INVENTOR
CARL P. TRESSELT

ATTORNEY

820 KHz DOPPLER DEVIATION

410 KHz DOPPLER DEVIATION

MULTIFREQUENCY CW RADAR WITH RANGE CUTOFF

CROSS-REFERENCE TO RELATED APPLICATIONS AND PATENTS

The invention described herein can be used to generate the control signals required in the adaptive speed control system described in Patent application Ser. No. 86,922, filed Nov. 4, 1970, by J. S. Weidman et al. and assigned to the assignee of the instant application.

BACKGROUND OF THE INVENTION

The use of doppler radar systems to determine range and range rate between relatively moving objects is well known in the art. In doppler radar systems the relative velocity between the two moving objects is expressed by the relationship:

$$f_d = 2V/C\, f \quad (1)$$

where:
$f_d$ = the doppler frequency
V = the relative velocity
C = the speed of light
$f$ = the transmitted frequency The above relationship is useful in determining the relative velocity between two relatively moving objects but does nothing toward yielding the range between the two objects. Accordingly, there has developed in the art a series of doppler radar systems in which two distinct frequencies are transmitted so that two doppler frequencies are available in the receiver. The phase relationship between the two doppler frequencies is then indicative of the range between the objects according to the relationship:

$$100 = 2\pi\,(2R/C)\,(f_2 - f_1) \quad (2)$$

where:
$\phi$ = the relative phase between the two doppler signals
R = the range to the target
C = the speed of light
$f_1$ and $f_2$ = the two transmitted frequencies Various systems are presently available in the art for determining range and range rate between relatively moving objects by use of the above relationships. As an example, U.S. Pat. No. 2,435,615, issued to R. H. Varian et al. on Feb. 10, 1948, describes a doppler radar system utilizing the phase relationship between dopplers obtained from the transmission of two frequencies in order to determine the range between relative moving objects.

Systems employing two distinct doppler frequencies and a determination of the phase relationship between the doppler frequencies in order to determine the relative range between two objects are useful only out to a given maximum range. This is so because the doppler phase comparison becomes ambiguous when the phase shift between the two dopplers is greater than 180°. Accordingly, depending upon the frequency difference between the two dopplers, there is a limited span of range over which the range measurement is unambiguous, corresponding to $\phi = \pi$ radians phase shift in Equation (2).

This problem has also been recognized in the art and various attempts have been made to solve the problem. As an example, the above-referenced Varian patent utilizes the transmission of three frequencies to obtain a course and fine range measurement and the two range measurements then combined to give an accurate range measurement.

Although various techniques exist for compensating for, or overcoming, the ambiguity in doppler range measurements, no known system contemplates or solves the particular problem faced in systems where receiver insensitivity to all targets beyond a preselected range is desired. Such a system is an adaptive speed control system which must respond to targets within a maximum range but be insensitive to all targets beyond that range, irrespective of the size of the targets. The adaptive speed control system disclosed in application Ser. No. 86,922, identified hereinabove, generates control signals when a vehicle is approaching another vehicle within a preselected range, for example — 300 feet, and in which the detected vehicle may be a hazard. In such a system, only targets lying within the maximum range present a hazard, and therefore any target lying outside the 300-foot range should not give an indication in the system. Attempts to solve this problem by limiting the sensitivity of the receiver have failed because of the variation in the size of targets reflecting the return signal. As an example, a very small vehicle within the 300-foot range must give an indication to the system. However, it is entirely possible for a very large target lying outside the 300-foot range to give the same intensity signal as the small target within the range. A successful system must be able to distinguish between these two targets and, as a consequence, existing systems do not fulfill the need because they lack the required insensitivity beyond the desired range.

SUMMARY OF THE INVENTION

The inventive system overcomes the deficiencies of the prior art doppler radar ranging systems in that it provides for positive range cutoff for a considerable region beyond a preselected maximum range. Although the invention is described in the environment of an adaptive speed control system for highway vehicles, it is useful in any doppler radar system in which the range measurement is considered important only up to a maximum selected range.

In the inventive system, three distinct frequencies are sequentially transmitted so that three doppler frequencies are available in the receiver when the transmitted signals are reflected from a target. The three transmitted carrier frequencies are selected such that the phase relationship of the dopplers produced by the highest and lowest transmitted frequency becomes ambiguous at the desired preselected maximum range. The interim frequency is selected to lie somewhere between the highest and lowest frequencies so that the phase relationship between the third doppler signal and one of the other two dopplers becomes ambiguous at a range which is greater than the preselected range.

Because three doppler frequencies are available in the receiver, an accurate range-to-target indication within the preselected range can be obtained by phase comparing the doppler frequencies received because of the transmission of the highest and lowest frequencies. The phase comparison is then a direct indication of range-to-target in accordance with relationship (2)

hereinabove. The receiver can be rendered insensitive to targets lying beyond the preselected range by phase comparing the interim doppler frequency with either of the two extremity doppler frequencies. Because the latter frequency difference is much less than that of the extremity doppler frequencies the range at which the ambiguity occurs is much greater than that at which the ambiguity occurs for the extremity doppler frequencies. Accordingly, the system utilizes one of the two interim doppler frequency differences to determine that the range is beyond the preselected maximum. When this condition occurs, an inhibit signal is generated so that the system controlled by the inventive radar is shut down and rendered non-responsive to the received signals. As soon as the range falls within the preselected maximum range the inhibit signal is no longer generated, and the controlled system is again responsive to control signals generated by the inventive radar.

DETAILED DESCRIPTION

Figure 1:
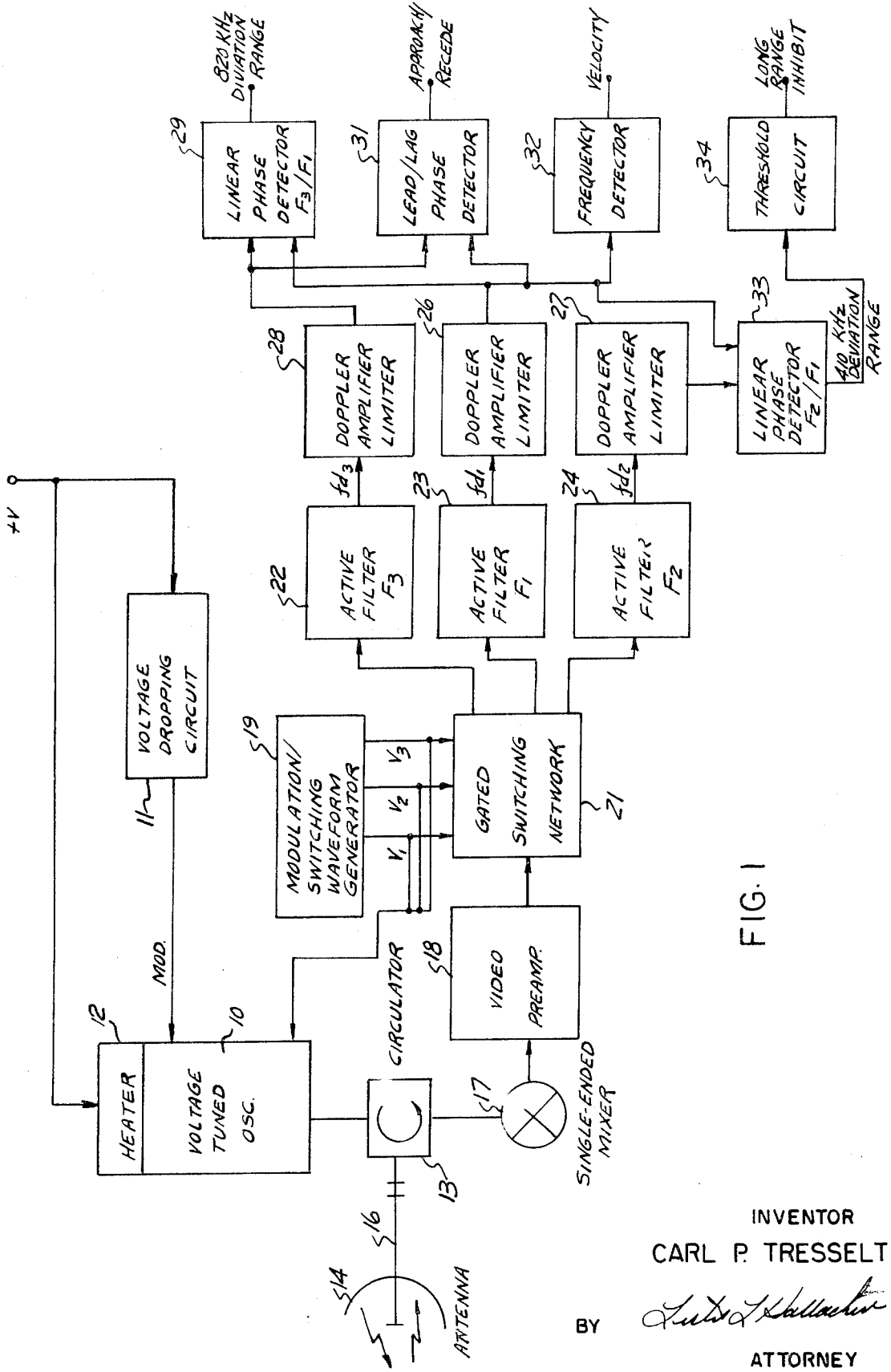
FIG. 1 shows a preferred embodiment of the inventive system.

The embodiment shown in FIG. 1 includes a voltage tuned Oscillator 10 which is used to generate the transmitted frequencies. Voltage-tuned Oscillator 10 therefore is of a type which will transmit different frequencies in response to different biasing voltages. As an example, Oscillator 10 can be a Gunn diode coupled to a varactor, with the varactor receiving varying biasing voltages to thereby cause the transmission of various frequencies by Oscillator 10. It will be noted that Oscillator 10 can include an avalanche diode or a tunnel diode, or if desired any other type of oscillator which will generate varying frequencies in response to varying biasing voltages.

Oscillator 10 is coupled to a positive biasing voltage +V through a Voltage Dropping Circuit 11. Dropping Circuit 11 is used merely to decrease the biasing voltage to the necessary operational voltage of Oscillator 10, and accordingly is optional. If desired a voltage regulator can be used to regulate the biasing voltage applied to Oscillator 10.

A Heater 12 is located in the proximity of Oscillator 10 and also is actuated by the +V biasing source. Heater 12 is used to maintain Oscillator 10 at a relatively constant temperature so that its frequency output is stable for all environmental conditions. Accordingly, Heater 10 is also optional depending upon the desired stability and environment in which the system will be used.

The output of Oscillator 10 is coupled to a Circulator 13 which couples the output from Oscillator 10 to Antenna 14 by way of a Waveguide Section 16. The R-F signal generated in Oscillator 10 is accordingly transmitted through free space by Antenna 14 and energy reflected from a target is received by Antenna 14. Waveguide Section 16 directs the reflected energy to Circulator 13 which then directs it to a Mixer 17. Waveguide Section 16 is intentionally mismatched so that small portion of the R-F signal from Oscillator 10 is directed to Mixer 17. Consequently, when a reflected signal is received by Antenna 14, both the reflected and transmitted signals are simultaneously present in Single-Ended Mixer 17. These signals are therefore mixed, resulting in a doppler signal, the frequency of which is proportional to the relative velocity between the target and Antenna 14 in accordance with Equation (1) hereinabove. The so-called homodyne output of Mixer 17 is directed to an Amplifier 18 and then a Gated Switching Network 21. Waveform Generator 19 produces gating voltage $V_1$, $V_2$, and $V_3$ to switch the doppler signals to appropriate channels in a manner described hereinafter.

Because Oscillator 10 is voltage tunable, the transmitted carrier frequency is controlled by applying a modulating voltage to Oscillator 10 by way of a modulating switching Waveform Generator 19. Generator 19 is composed of standard type of logic circuitry within the purview of one skilled in the art, and therefore the details of this circuit need not be described herein. The modulating voltage $V_{mod}$ applied to Oscillator 10 by the Waveform Generator 19 is shown in FIG. 3a. Assuming that Oscillator 10 includes a varactor-tuned Gunn diode, the modulating waveform applied to the varactor to cause the generation of three frequencies $f_1$, $f_2$, and $f_3$ will be stepped in the manner shown in FIG. 3a. The first voltage level $V_1$ applied to Oscillator 10 is selected to result in the generation of frequency $f_1$. The voltage $V_1$ is applied for a preselected time period, at the end of which the biasing voltage is switched upwardly to the second voltage level $V_2$ so that a frequency $f_2$ is generated by Oscillator 10. Voltage $V_2$ also is applied for the preselected time period at the end of which the third biasing level $V_3$ is applied to Oscillator 10 causing the generation of $f_3$ frequency. At the end of the $f_3$ generation period the modulating voltage $V_{mod}$ drops back to $V_1$ and frequency $f_1$ is again generated. The three frequencies $f_1$, $f_2$, and $f_3$ accordingly are sequentially transmitted, in that order, on a repetitive basis so that the system operates as a sampled data, continuous wave radar at each of the three frequencies. This type of modulation can be employed to frequency tune any tunable oscillator, irrespective of what type of oscillator is used. However, the values of the voltages for each frequency will change for different types of oscillators. If a varactor-tuned 36 GHz Gunn diode is used, the voltages for $f_1$, $f_2$, and $f_3$ might typically be 6, 6.1, and 6.2, respectively.

Simultaneously with the generation of the modulating waveform $V_{mod}$ Waveform Generator 19 generates the gating voltages $V_1$, $V_2$, and $V_3$ which are directed to Gated Switching Network 21. Switching Network 21 is composed of standard logic circuitry within the purview of one skilled in the art, and therefore its details need not be described herein. For example, gating voltages $V_1$, $V_2$, and $V_3$ can be applied to the bases of three transistors used as shunt gates. The transistors conduct while the positive voltages are applied and then short the dopplers to ground. When gating voltages $V_1$, $V_2$, and $V_3$ are zero, the transistors are nonconductive and doppler is passed to Active Filters 22, 23, and 24. Obviously, if desired other types of gating can be used. Switching Network 21 therefore receives the gating voltages $V_1$, $V_2$, and $V_3$ and the doppler signals, and sequentially and selectively directs the doppler signals to Active Filters 22, 23, and 24, which are part of three separate doppler channels. FIGS. 3b, 3c, and 3d show gating voltages $V_1$, $V_2$, and $V_3$ used to selectively actuate Gating Network 21 to direct doppler signals to Filters 22, 23, and 24 so that the proper doppler signals are directed to the various doppler channels. Gating Voltage $V_1$, illustrated in FIG. 3b, is zero for a time period which is equal to the last half of the time period during which the frequency $f_1$ is transmitted. Accordingly, by using the transistor switching technique described hereinabove, Filter 23 is fed video signals from Preamp 18 only during this period of time. As a consequence, only reflected signals received by Antenna 14 during the last half of the $f_1$ transmission time period will produce a doppler signal sample $f_{d1}$ in Active Filter 23 because of gating action of Gated Switching Network 21. Gating Network 21 is actuated only for the last half of the generation of each frequency in order to prevent interfrequency mixing of signals received from large targets lying beyond the preselected range.

Active Filter 23 is fed such samples of doppler each time $f_1$ is transmitted. This low-pass filter turns this pulse train into an analog doppler signal. The sampling rate of the process is many times the highest doppler frequency encountered in the system. At the end of the transmission period of frequency $f_1$ the gating is such that Filter 23 does receive a doppler sample until the last half of the transmission period in which frequency $f_1$ is again transmitted.

Gating voltage $V_2$ prevents the injection of a doppler to Filter 24 until the last half of the period during which frequency $f_2$ is generated. During the last half of the $f_2$ generation period gating voltage $V_2$ allows the doppler signal sample present in Video Amplifier 18, produced by mixing between the carrier frequency $f_2$ and a target reflected frequency $f_2$, to pass to Filter 24. The output of Filter 24 is then the interim analog doppler signal $f_{d2}$.

The same type of gating action is used to feed Active Filter 22 so that it receives $f_{d3}$ doppler signal samples produced only during the last half of the transmission of frequency $f_3$ by the action of gating voltage $V_3$. It is now apparent that the sequential generation of three frequencies $f_1$, $f_2$, and $f_3$ results in the independent generation of three analog doppler signals $f_{d1}$, $f_{d2}$, and $f_{d3}$.

The three doppler signals are individually directed to Limiter Amplifiers 26, 27, and 28. Limiters 26, 27, and 28 limit the amplitudes of the doppler signals, producing squarewave output doppler waveshapes. The remainder of the system is therefore insensitive to amplitude variations in the doppler signals for signals above the threshold of the limiters. Range measurements are therefore independent of any amplitude measurements. The limited outputs of Limiter Amplifiers 26, 27, and 28 are combined in a selected manner to yield the desired output signals.

The doppler outputs of Limiters 26 and 28, which respectively are $f_{d1}$ and $f_{d3}$, are directed to a Linear Phase Detector 29. Phase Detector 29 yields an output signal which is proportional to the difference in phase between the doppler frequencies $f_{d1}$ and $f_{d3}$. Accordingly, this output signal is an indication of the range between Antenna 14 and the target reflecting the received energy.

The doppler outputs $f_{d1}$ and $f_{d3}$ of Limiters 26 and 28, respectively, are also directed to a Lead/Lag Phase Detector 31. By noting whether $f_{d1}$ leads or lags $f_{d3}$ and generating a signal having a polarity depending upon this lead/lag relationship, an approach/recede signal is generated by Phase Detector 31 which indicates whether the relative velocity between Antenna 14 and the energy reflecting target is closing or opening.

The output of Limiter 26 is also directed to a Frequency Detector 32. Detector 32 yields an output signal which is proportional to the frequency of doppler signal $f_{d1}$ and accordingly is a signal representative of the relative velocity between Antenna 14 and the target reflecting the energy. It should be noted that the $f_{d3}$ doppler from Limiter 28 can also be used to derive the velocity signal. Obviously, if desired, the doppler signal $f_{d2}$ can also be used to derive the velocity signal. Alternatively, if desired, the two doppler signals $f_{d1}$ and $f_{d3}$ can both be used to obtain a velocity signal and the two velocity signals averaged to yield a more accurate reading.

Another Linear Phase Detector 33 receives the $f_{d1}$ doppler signal from Limiter 26 as well as the $f_{d2}$ doppler signal from Limiter 27. The output of Phase Detector 33 therefore is a long-range signal representative of the phase difference between doppler $f_{d1}$ and $f_{d2}$. This signal is directed to a Threshold Circuit 34 which generates a long-range inhibit signal when the range is above the preselected distance.

Figure 3:
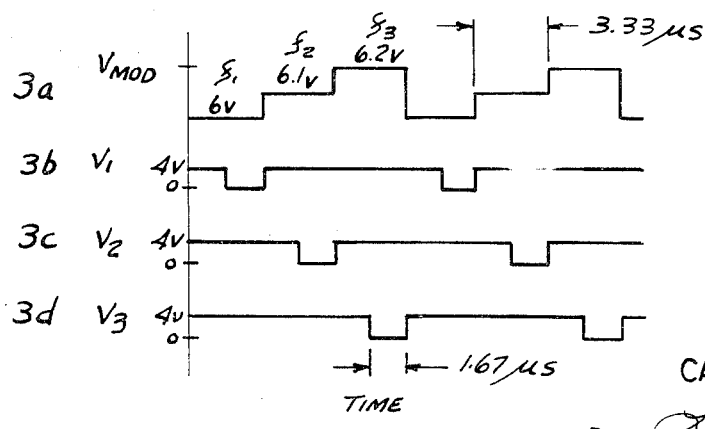
FIG. 3 shows the modulating voltage waveform and the gating voltage waveforms used in the circuit shown in FIG. 1.

For convenience, and by way of example only, the operation of the system is described on the basis of the assumption that the operational frequency of Oscillator 10 is 36 GHz. For a range cutoff of 300 feet, the differences in frequency of the two dopplers should be 820 KHz. Accordingly, $f_1$ and $f_3$ will be separated by the frequency difference of 820 KHz. These values also are presented as exemplary only and to ease the understanding of the invention. As shown in FIG. 3, the change from $f_1$ to $f_3$ is accomplished by changing the biasing voltage to Oscillator 10 from 6 to 6.2 volts (assuming a varactor-tuned Gunn diode is used to Oscillator 10). The intermediate transmitted frequency $f_2$ will lie anywhere between the two frequencies $f_1$ and $f_3$. If the biasing waveform shown in FIG. 3a is used, frequency $f_2$ will lie midway between $f_1$ and $f_3$ — that is, it will be 410 KHz up from $f_1$ and 410 KHz down from $f_3$. It will be appreciated that this is chosen as a matter of convenience and example only in that frequency $f_2$ need not lie exactly midway between $f_1$ and $f_3$.

Figure 2A:
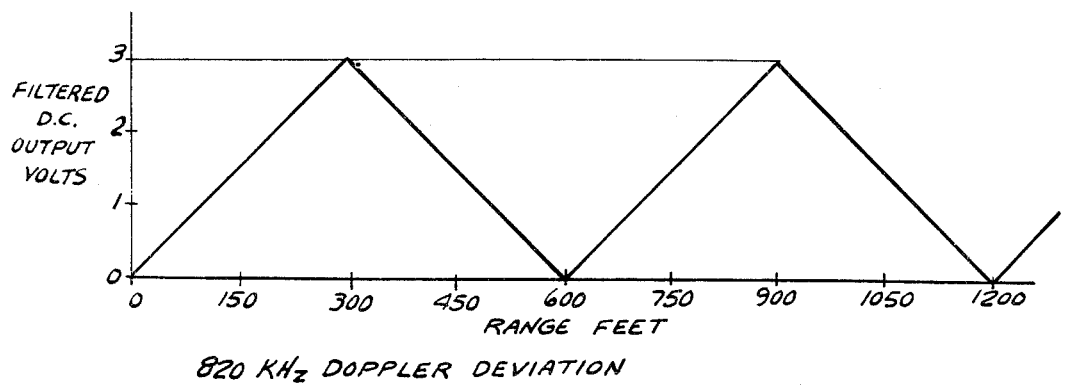
FIGS. 2a and 2b show the voltage range characteristics obtained by phase comparison between two doppler comparisons having different frequency spreads.

With $f_1$ and $f_3$ separated by 820 KHz, the output of Phase Detector 29, which detects the phase difference between $f_{d1}$ and $f_{d3}$, will vary in accordance with the waveform shown in FIG. 2a. When the range is zero, the output of Phase Detector 29 will also be zero. The voltage level output of Phase Detector 29 increases linearly and unambiguously to a 300-foot range. Accordingly, at all ranges out to 300 feet an unambiguous range indication is given by Phase Detector 29. However, at 300 feet dopplers $f_{d1}$ and $f_{d3}$ are 180° out of phase so that beyond this range the output indication is ambiguous. This is so because it is impossible to distinguish a voltage along the decreasing slope of FIG. 2a from a voltage level along the increasing slope. Another ambiguity arises because between 600 and 900 feet the voltage output of Phase Detector 29 could be mistaken for an output which would ordinarily be found between zero and 300 feet. Reflections from large targets, such as trucks, around the 600-foot region in particular, can result in returns which confuse the system. These ambiguities are overcome by utilizing an interim frequency $f_2$.

Figure 2B:
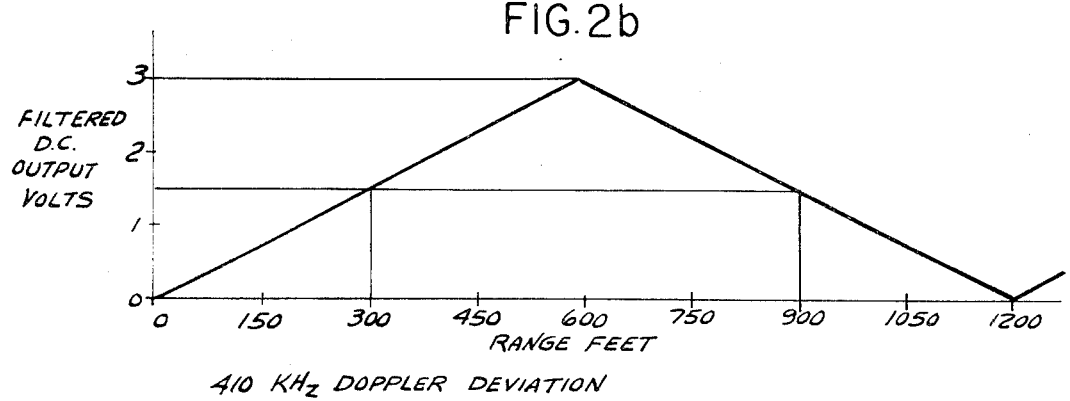

As shown in FIG. 1 the doppler frequencies resulting from the transmission of $f_1$ and $f_2$ are directed to Linear Phase Detector 33. These two frequencies in the example described herein have a 410 KHz difference. Accordingly, the output of Phase Detector 33 has a waveform characteristic as illustrated in FIG. 2b. FIG. 2b is very similar to FIG. 2a, except that the ambiguity occurs at 600 feet instead of 300 feet. The long-range inhibit signal is generated by the use of Threshold Circuit 34. As shown in FIG. 2b, at 300 feet the output of Phase Detector 33 is approximately 1.5 volts. Threshold Circuit 34 is set to fire at this point, and will not yield an output until its input signal rises above 1.5 volts. When the 1.5 volt input is exceeded by targets in the 300 to 900 foot region, an output is presented by Threshold Circuit 34 and used as the long-range inhibit signal for the control system to which the inventive doppler radar system is coupled. The system therefore is completely insensitive to all targets lying beyond 300 feet, out to 900 feet, irrespective of the magnitude of the signal received from the target. For this reason, large targets lying beyond 300 feet and out to 900 feet do not result in an inaccurate indication in the system. However, the 900 to 1200 foot portion of the waveform shown in FIG. 2b is below the chosen threshold voltage, making it possible for a target within these ranges to produce erroneous system measurements. Such returns should not constitute a problem if a low-powered homodyne radar system is employed because the sensitivity of such a system would probably be insufficient to result in a response to virtually all signals from targets beyond the 900 foot range.

The inventive system can be modified to accomodate homodyne systems that do have sufficient sensitivity to respond to large mobile targets in the ambiguity region around 1200 feet. In the modified system, the frequency difference between $f_1$ and $f_2$ would be chosen to be smaller than the 410 KHz mentioned. The choice of 820 KHz/3 = 273 KHz difference frequency, for example, along with a 1-volt threshold level (with a 3-volt peak ambiguity) will provide inhibition for targets within the ranges from 300 to 1500 feet. In view of the postulated higher sensitivity of such a system, the signal-to-noise ratio at the 300 foot point will be adequate to trigger the inhibit system with little jitter. To prevent adjacent frequency mixing at the longer ranges involved it may be preferable to gate so that the channels are opened only during the last one fourth of the transmission period for each frequency.

In lower sensitivity systems with the third transmitted frequency located midway between the other two, it might prove useful to compare dopplers from the low and middle frequency channel in one phase comparator and to compare the doppler from the middle and high frequency channels in a similar comparator and average the two results. A signal-to-noise ratio advantage is thus obtained over the low-high frequency measurement channel which would be useful in guaranteeing inhibition against marginal size targets.

In the preceding description and in the embodiment shown in FIG. 1, the output of Oscillator 10 is directed to a Circulator 13 and Mixer 17. These elements can be eliminated if a diode having a negative resistance characteristic is used as Oscillator 10. Accordingly, if a Gunn diode, an avalanche diode, or a tunnel diode is used as the Oscillator 10, Mixer 17 and Circulator 13 are not required because each of these diodes exhibits a self-mixing function so that the doppler signals are generated within the diodes themselves. If such a system is used, the input terminal of Amplifier 18 can be connected to a resistor contained within the Oscillator and the doppler frequencies taken directly from the oscillating/mixing element.

What is claimed is:

1. A doppler system capable of generating an inhibit signal in response to targets beyond a preselected range comprising:
   means for sequentially generating signals of at least three carrier frequencies;
   means for transmitting said signals and receiving reflected signals from a target having a relative velocity with respect to said means for transmitting, the reception of said reflected signals resulting in the production of a doppler signal for each signal transmitted;
   gating means for individually gating each of said doppler signals to a doppler channel so that separate doppler signals are present as outputs from said channels;
   first phase detector means simultaneously receiving a first two of said doppler signals and producing a range signal indicative of the range between said target and said means for transmitting;
   second phase detector means receiving another two of said doppler signals and producing an output useful as said inhibit signal.

2. The system of claim 1 wherein there are three of said signals generated so that three doppler signals are produced; said first phase detector receives the doppler signals corresponding to the highest and lowest of said transmitted frequencies as said first two dopplers; and said second phase detector receives one of said first two doppler signals and the other of said dopplers to produce said inhibit signal.

3. The system of claim 1 wherein the transmitted frequencies resulting in said first two doppler signals are separated by a preselected frequency range and the transmitted frequencies resulting in said another two dopplers are separated by a second frequency range less than said preselected frequency range.

4. The system of claim 3 wherein three of said signals are transmitted so that three doppler signals are produced, the transmitted frequencies resulting in said first two doppler signals constituting the highest and lowest of said transmitted frequencies and the transmitted frequencies resulting in said another two doppler signals constituting one of said first two and the third of said transmitted frequencies.

5. The system of claim 4 wherein the transmitted frequency resulting in said third doppler signal lies midway between the transmitted frequencies resulting in said highest and lowest doppler signals.

6. The system of claim 3 wherein said second frequency range is one half of said preselected frequency range.

7. The system of claim 2 wherein the transmitted frequency resulting in said other of said dopplers is midway between the transmitted frequencies resulting in said highest and lowest dopplers.

8. The system of claim 1 wherein said gating means includes gating voltage generating means for individually opening said doppler channels during the transmission of said transmitted signals so that said doppler signals are properly received by said first and second phase detectors.

9. The system of claim 8 wherein said doppler channels are opened only during the last half of the time the corresponding transmitted signal is transmitted.

10. The system of claim 4 wherein said gating means includes gating voltage generating means for opening said doppler channels so that said doppler signals are properly directed to said channels, the first of said channels being open only during the last portion of the transmission period of the first of said frequencies; the second of said channels being open only during the last portion of the transmission period of the second of said frequencies, and the third of said channels being open only during the last portion of the transmission period of the third of said frequencies.

11. The system of claim 10 wherein said last portions are the last one half of the transmission periods.

12. The system of claim 1 wherein said means for generating is a voltage responsive oscillator.

13. The system of claim 12 wherein said gating means includes means for varying the voltage applied to said oscillator so that said at least three frequencies are generated.

14. The system of claim 13 wherein said gating means includes gating voltage generating means for individually opening said doppler channels during the transmission of said transmitted signals.

15. The system of claim 14 wherein said doppler channels are opened only during a portion of the time the corresponding transmitted signal is transmitted.

16. The system of claim 15 wherein the transmitted frequencies resulting in said first two doppler signals are separated by a preselected frequency range and the transmitted frequencies resulting in said another two dopplers are separated by a second frequency range less than said preselected frequency range.

17. The system of claim 16 wherein three of said signals are transmitted so that three doppler signals are produced, said first two doppler signals corresponding to the highest and lowest of said transmitted signals and said another two doppler signals constituting one of said first two and the third of said transmitted signals.

18. The system of claim 17 wherein the transmitted frequency resulting in said third doppler signal lies midway between the transmitted frequencies resulting in said highest and lowest doppler signals; and wherein said portion is the last half of each transmission period.

19. The system of claim 15 wherein said oscillator includes a device having a negative resistance characteristic.

20. The system of claim 18 wherein said oscillator includes a device having a negative resistance characteristic and a varactor; said varactor receiving the voltage applied to said oscillator so that said at least three frequencies are generated.

21. The system of claim 1 further including a threshold circuit, said threshold circuit receiving the output of said second phase detector and generating said inhibit signal when the output of said second phase detector is above a preselected level.

22. The system of claim 3 further including a threshold circuit receiving the output of said second phase detector and generating said inhibit signal when the output of said second phase detector is above a preselected level.

23. The system of claim 11 further including a threshold circuit receiving the output of said second phase detector and generating said inhibit signal when the output of said second phase detector is above a preselected level.

24. The system of claim 19 further including a threshold circuit receiving the output of said second phase detector and generating said inhibit signal when the output of said second phase detector is above a preselected level.

25. A method of providing an inhibit signal beyond a preselected range in a doppler radar system including the steps of:

generating a plurality of at least three frequencies;

sequentially transmitting said frequencies as transmitted signals and receiving said frequencies as reflected signals;

producing a doppler signal for each transmitted signal by mixing a portion of the transmitted signal with the corresponding reflected signal of the same frequency;

individually gating each doppler signal to a separate doppler channel;

combining two of said doppler signals having a preselected frequency spread to produce a range signal;

and combining another two of said doppler signals having a frequency spread less than said preselected frequency spread to produce said inhibit signal.

26. The method of claim 25 wherein said step of transmitting includes the transmission of three frequencies so that three doppler signals are produced;

said combining step includes combining the extremity carrier frequency dopplers of said three dopplers to produce said range signal;

said step of combining another two dopplers includes combining one of said extremity carrier frequency dopplers and the third of said dopplers to produce said inhibit signal.

27. The method of claim 26 wherein said three frequencies are evenly spaced and said third doppler signal is the middle doppler signal.

28. The method of claim 27 wherein said gating step includes gating said doppler channels so that each doppler gate is open only during the transmission of the transmitted frequency creating said doppler.

29. The method of claim 27 wherein said gating step includes gating said doppler channels during a portion of the time period that the corresponding frequency is transmitted.

30. The method of claim 29 wherein said portion is the last half of the transmission period.

* * * * *